Nov. 20, 1956 — A. L. LINDOW — 2,770,874
METHOD OF LOCALLY EXPANDING TUBING
Filed April 27, 1953

INVENTOR.
ARTHUR L. LINDOW
BY
ATTORNEY

United States Patent Office 2,770,874
Patented Nov. 20, 1956

2,770,874
METHOD OF LOCALLY EXPANDING TUBING

Arthur L. Lindow, Macedonia, Ohio, assignor to The Cleveland Pneumatic Tool Company, Cleveland, Ohio, a corporation of Ohio Application April 27, 1953, Serial No. 351,412

2 Claims. (Cl. 29—421)

This invention relates to a new and useful improvement in a method for locally expanding tubing, such as seamless steel tubing and the like.

Broadly, this method deals with the local expansion of tubing by hydrostatic pressure, but more particularly it contemplates the use of a plastic, non-compressible material placed inside the tubing and subjected to pressure by means of opposed plungers axially slidable in the tubing. Such methods have heretofore been used, but all were confronted with the same difficult problem of sealing the plastic material and preventing its escape or leakage between the tubing and plungers.

It is therefore the main object of this invention to provide a method for locally expanding tubing by using a pressurized plastic material capable of effecting its own seal, and thereby preventing its leakage between the tubing and plungers.

Another object of this invention is to use in such method as plastic material a molten metal having a melting point considerably lower than that of the tubing, and adapted to flow freely under pressure, and which is readily available.

These and other objects will be in part obvious and in part pointed out hereinafter.

Figure 4:
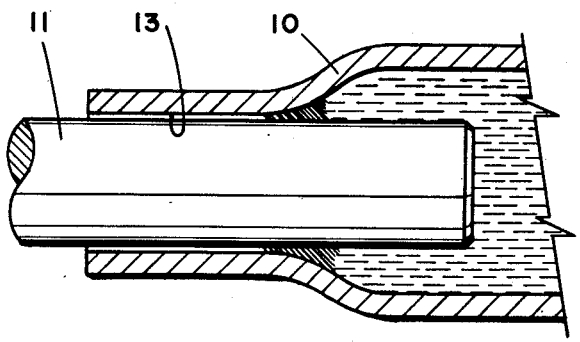
Figure 4 is an enlarged view of a portion of Figure 3, with the die removed and showing, the fluid tight seal created between the tubing and one of the plungers.

Referring to the drawing, 10 represents a piece of tubing, which may be made of any expansible metal, such as seamless steel tubing, used extensively in the manufacture of airplanes and more particularly of airplane landing gears. Such tubing is of relatively thin wall expansible to the desired shape in the manner hereinafter described, thereby saving many hours of machining time and greatly reducing the cost of production. Slidably mounted in the tubing are two opposed plungers 11 and 12 which may be moved toward each other, that is, inwardly, by pressure applied thereon either hydraulically or by any other suitable means. In order to assure free slidable movement of the plungers in the tubing and allow for heat expansion of the latter, the plungers are loosely fitted in the tubing and define with the inner wall thereof a small annular clearance 13 shown somewhat enlarged in Figure 4. The portion of the tubing to be expanded is placed in a sectional die 14, which is of a size calculated to enable longitudinal movement of the tubing relative to the die even after heat expansion of the tubing. The cavity 15 of the die is shaped to conform exteriorly to the expansion which is to be formed.

In practice, the portion of the tubing which is to be expanded is filled with a metal axially confined between the inner ends of the plungers 11 and 12. Preferably this metal has a melting point substantially lower than that of the tubing, and when in a molten state it is free to flow under pressure. Metals such as aluminum and aluminum alloys have been found to be very satisfactory for the purpose of expanding steel. Their relatively low melting points and specific weights, together with their excellent sealing qualities when in a solid state make them especially adaptable for this purpose.

While it is to be understood that this method is not intended to be limited to the use of aluminum or aluminum alloys, it will hereinafter be described with molten aluminum as the plastic material.

Figure 1:
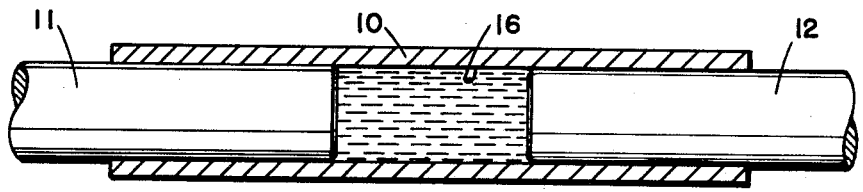
Figure 1 is a longitudinal sectional view of the tubing intended to be expanded, and illustrating the molten metal confined between two slidable plungers.
Figure 2:
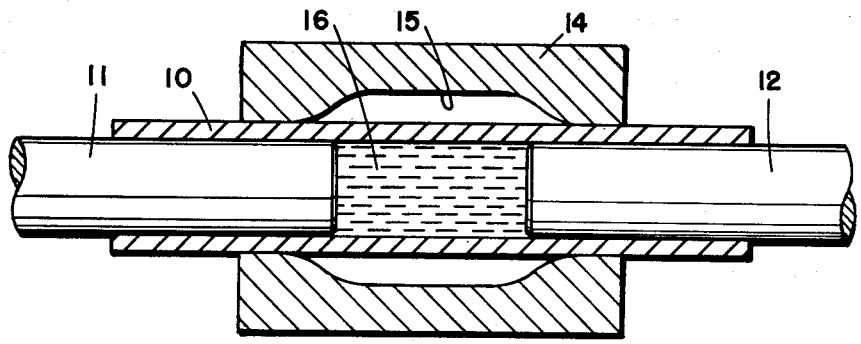
Figure 2 is a view similar to Figure 1, but with the portion of the tubing to be expanded placed in a sectional die shaped to conform exteriorly to the tubing expansion.
Figure 3:
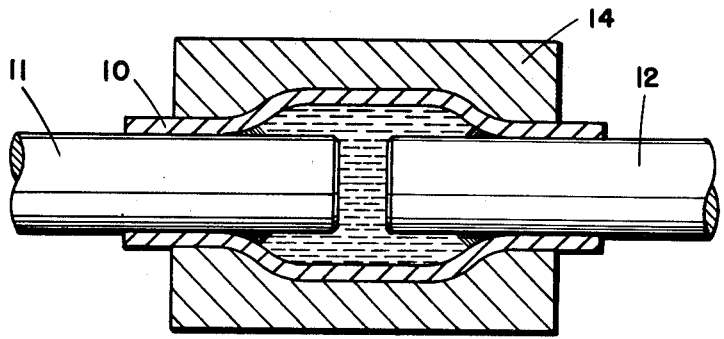
Figure 3 is a longitudinal sectional view of the tubing in the die after expansion.

As previously stated and shown in the drawing, the portion of the tubing 10 intended to be expanded, that is, the cylindrical chamber 16 extending between the plungers 11 and 12 in Figure 1, is first filled with aluminum. Thereafter that portion of the tubing is heated in excess of 1200° F., thereby causing the aluminum filling the chamber 16 to melt and become liquid. With the aluminum still in a molten state, the heated portion of the tubing is then placed in the die 14, and the metal subjected to opposed equal pressure applied on the plungers 11 and 12, thereby causing the molten metal to flow radially outward for expanding the tubing so as to cause it to conform to the shape of the die 14, or more particularly of its cavity 15.

As the plungers 11 and 12 are rammed forwardly to subject the molten aluminum to relatively high pressure causing expansion of the tubing, some of the molten metal is attempting to leak or escape from the chamber 16 through the clearance 13. In the present method, this clearance is surrounded by walls of a temperature substantially lower than the melting point of the aluminum. In other words, the clearance 13 is located in a zone of a lower temperature than the melting point of the aluminum, and since the clearance is radially relatively small, any molten aluminum attempting to escape therethrough will solidify therein to form a perfect fluid tight seal preventing escaping of the molten metal from the chamber 16.

After cooling, the die 14 is removed and the tubing reheated to melt all of the aluminum therein, thereby enabling removal of the plungers 11 and 12 and of the aluminum by pouring it out of the tubing.

The use of molten aluminum as plastic material subjected to relatively high pressure for expanding the tubing, offers may important advantages. Being a metal, it lends itself to induction heating, and metallurgically the steel of the tubing is not contaminated with alloys. It is neither hazardous nor toxic to handle when in a molten state, and is readily available at relatively low cost.

I claim:

1. The method of forming local expansion of tubing consisting of filling the portion of the tubing to be expanded with molten metal having a melting point lower than that of the tubing, causing said molten metal to flow radially outward to expand said tubing by applying equal opposed pressure thereon through two opposed plungers slidable in said tubing and forming therewith a slight clearance surrounded by walls colder than the melting point of said metal while confining the tubing around said plunger to maintain the slight clearance, said clearance being filled by said pressurized molten metal which solidifies therein to arrest escape of molten metal therethrough.

2. The method of forming local expansion of tubing consisting of filling the portion of the tubing to be expanded with a molten metal having a melting point below that of the tubing, axially confining said molten metal between two plungers axially slidable in said tubing and defining therewith a clearance, placing said portion of the tubing in a sectional die shaped to conform exteriorly to the expansion which is to be formed and having proportions adapted to confine the tubing around said plungers to prevent expansion thereof, subjecting said molten metal to pressure applied on said plungers for expanding said tubing so as to cause it to conform to the shape of said die, said clearance being located in a zone colder than said melting point and having some of said molten metal attempting to leak therethrough solidified therein to form a fluid tight seal.

References Cited in the file of this patent

UNITED STATES PATENTS

| | | |
|---|---|---|
| 1,710,776 | Langenberg | Apr. 30, 1929 |
| 2,202,042 | Blount | May 28, 1940 |
| 2,540,688 | Novy | Feb. 6, 1951 |